United States Patent
Kelly

(10) Patent No.: US 6,489,584 B1
(45) Date of Patent: Dec. 3, 2002

(54) ROOM-TEMPERATURE SURFACE WELD REPAIR OF NICKEL-BASE SUPERALLOYS HAVING A NIL-DUCTILITY RANGE

(75) Inventor: Thomas Joseph Kelly, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/850,895

(22) Filed: May 8, 2001

(51) Int. Cl.[7] ............................... B23K 10/00
(52) U.S. Cl. ................... 219/121.46; 219/121.37; 219/121.59; 228/262.3; 148/525
(58) Field of Search ............... 219/121.46, 121.45, 219/121.38, 121.37, 121.59, 121.48, 137 WM; 148/443, 903, 525; 228/262.3

(56) References Cited

U.S. PATENT DOCUMENTS

| | | | |
|---|---|---|---|
| 4,219,592 A | 8/1980 | Anderson et al. | 427/405 |
| 4,804,815 A | 2/1989 | Everett | 219/121.6 |
| 4,851,636 A | 7/1989 | Sugimoto et al. | 219/121.59 |
| 4,878,953 A * | 11/1989 | Saltzman et al. | 148/4 |
| 5,106,010 A | 4/1992 | Stueber et al. | 228/232 |
| 5,374,319 A | 12/1994 | Stueber et al. | 148/404 |
| 5,395,584 A * | 3/1995 | Berger et al. | 420/443 |
| 5,897,801 A | 4/1999 | Smashey et al. | 219/137 |
| 5,898,994 A | 5/1999 | Miller et al. | 29/889.1 |
| 5,913,555 A | 6/1999 | Richter et al. | 29/889.1 |
| 5,914,059 A * | 6/1999 | Marcin, Jr. et al. | 219/121.66 |
| 6,054,672 A | 4/2000 | Foster et al. | 219/121.66 |
| 6,084,196 A * | 7/2000 | Flowers et al. | 219/121.46 |
| 6,087,616 A | 7/2000 | Apunevich et al. | 219/121.46 |

OTHER PUBLICATIONS

Pintout of website page for Pro–Fusion, http://www.profisiononline.com/welding/plasma.htm, printed May 3, 2001, 7 pages total.

Printout of website page for Liburdi Engineering, http://www.liburdi.com/cgi–bin/sitedata, printed May 3, 2001, 3 pages total.

\* cited by examiner

Primary Examiner—Mark Paschall
(74) Attorney, Agent, or Firm—David L. Narciso; Gregory O. Garmong

(57) ABSTRACT

A near-surface defect in a nickel-base superalloy article having a nil-ductility range is weld repaired with a low-power, directional, spatially confined heat source. During the weld repair procedure, the body of the article is maintained at room temperature. Simultaneously, the surface of the article is locally melted in the region of the near-surface defect using the heat source to form a melted region, and thereafter the melted region is allowed to solidify. The heat source produces a shallow weld pool that allows the near-surface defect to be floated to the surface in the case of an inclusion, or welded closed in the case of a surface crack or near-surface void.

20 Claims, 3 Drawing Sheets

ROOM-TEMPERATURE SURFACE WELD REPAIR OF NICKEL-BASE SUPERALLOYS HAVING A NIL-DUCTILITY RANGE

The invention herein described was made in the course of or under a contract or subcontract thereunder (or grant) with the Department of the Navy.

This invention relates to the weld repair of surface defects in alloys, and more particularly to such repairs conducted on cast nickel-base superalloys having a nil-ductility range.

BACKGROUND OF THE INVENTION

Nickel-base alloys contain more nickel than any other element, plus alloying elements that are added to improve the mechanical and physical properties of the alloy. Nickel-base superalloys are nickel-base alloys that are strengthened by precipitation of gamma prime and/or a related phase. These materials are used in aircraft gas turbine components and other applications which require good strength, creep resistance, fracture toughness, and other mechanical properties at elevated temperatures such as 1500° F. and higher for extended periods of time.

The selection of the types and amounts of alloying elements present in the alloy, in combination with the thermal processing, determines to a large degree the properties of the alloy. In some cases, the nickel-base superalloy is moderately strong and moderately ductile, even at high temperatures. In other cases, the combination of alloying elements causes the material to be very strong but of limited ductility even at temperatures approaching the melting point, a temperature at which many alloys become highly ductile.

In one class of nickel-base superalloys, the alloy has very small, substantially no (nil), ductility in the temperature range between the solidus (freezing) temperature of the alloy and a temperature about 600° F. below the solidus temperature. This behavior plays a significant role in the properties of the alloy, because as the alloy is cooled through this range, or is processed or operated while in this range, the material is highly susceptible to the formation of cracks and other defects which remain in the structure upon cooling to room temperature and during service. Such cracks can also occur later in the processing, as for example in the formation of hot tears during welding and post-weld heat treatments. Examples of such nickel-base superalloys having a "nil-ductility range" are Rene 108 and Mar-M246.

Articles made of nickel-base superalloys are usually cast from the melt into a mold, with investment casting being the most popular approach, and then further processed. The as-cast articles sometimes have near-surface defects such as hot tears, surface-connected porosity due to shrinkage defects, and near-surface inclusions, which are acute problems for the alloys having a nil-ductility range. These near-surface defects are deleterious to the properties of the article, either directly or by preventing the closure of interior porosity and shrinkage cavities during subsequent processing.

If the surface defects are not too severe, as is often the case, they may be repaired. However, earlier repair techniques involving welding procedures are not fully successful in removing the near-surface defects, particularly for the nickel-base superalloys with a nil-ductility range. It is often the case that the repair procedure itself leads to even further defects, which in turn must be repaired. The repair procedures are accordingly very labor intensive, time consuming, and expensive. They also result in products which may have reduced properties at the location of the repair.

An important advance in welding repair procedures was disclosed in U.S. Pat. No. 5,897,801. In this approach, the weld repair is performed with the article heated to an elevated temperature and in a controlled atmosphere. The approach works quite well for many applications. If the article is large in size, the required controlled-atmosphere heating oven is also quite large and involves a large capital expenditure. The repair cost for each article is relatively high, due to the use of the controlled-atmosphere heating oven, the long cycle time for each article, and the skill required.

There is accordingly a need for an improved technique for repairing near-surface defects in articles made of nickel-base superalloys having a nil-ductility range at elevated temperature, which achieves good results yet is less expensive than the approach of the '801 patent. The present invention fulfills this need, and further provides related advantages.

SUMMARY OF THE INVENTION

The present invention provides a method for weld repairing a nickel-base superalloy article having a nil-ductility range. It is suitable for repairing relatively small near-surface defects, such as small surface cracks, small near-surface pits, and near-surface inclusions such as small ceramic particles. These small near-surface defects are often the cause of the rejection of castings of nil-ductility-range nickel-base superalloys. The present approach allows the repair of these smaller defects at room temperature and without generally heating the body of the article to elevated temperature, so that the repair operation may proceed much more rapidly than does the approach of the '801 patent. The approach of the '801 remains the preferred technique for repairing larger defects and for joining articles made of the nil-ductility-range nickel-base superalloys.

A method of weld repairing a nickel-base superalloy article having a nilductility range from a solidus temperature of the superalloy to about 600° F. below the solidus temperature comprises the steps of furnishing the article of such a composition and having a body with a near-surface defect near a surface thereof, and providing a heat source having a heat source beam with an amperage of no greater than about 5 amperes. The diameter of the heat source beam is preferably no greater than about 0.025 inches. Examples of suitable nickel-base superalloys having a nil-ductility range include R108, Mar M-246, AF2-1DA, Udimet 500, B1900, and Udimet 700. The article may be in any form, but is typically in an as-cast state. The heat source is preferably a plasma welding torch. Examples of near-surface defects are pits, cracks, and solid inclusions such as embedded ceramic particles.

The method further includes weld repairing the near-surface defect, the step of weld repairing including the steps of locally melting the surface of the article in a region of the near-surface defect using the heat source to form a melted region, while not otherwise heating the body of the article, and thereafter allowing the melted region to solidify. The melted region preferably has a molten pool depth of no greater than about 0.030 inch, more preferably no greater than about 0.020 inch, and most preferably no greater than about 0.010 inch. The melted region is thereafter allowed to solidify.

The repair may be accomplished either by heating and melting the region of the near-surface defect without the addition of a filler metal, or by adding a filler metal into the melted region. The filler metal, where used, typically has a filler metal composition that is substantially the same as that of the nickel-base superalloy of the article.

The present approach utilizes a small, narrowly focused, low-power heat source such as a small plasma welding torch or a laser. The heat source melts only a small depth at and below the surface of the article. The portions of the article that are further from the surface are not substantially affected by the welding process. Accordingly, there is reduced concern that hot tears and strain-age cracking in a heat affected zone (HAZ) will affect the body. The present approach has the important advantage that it is accomplished at ambient temperature without heating the body of the article and does not require the use of a special atmosphere. The processing is therefore much faster and uses less capital equipment than required for the approach of the '801 patent, although the present approach is more limited in the types of defects that may be repaired than is the approach of the '801 patent. For example, the present approach is not concerned with blade-tip and other larger-size weld repairs.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
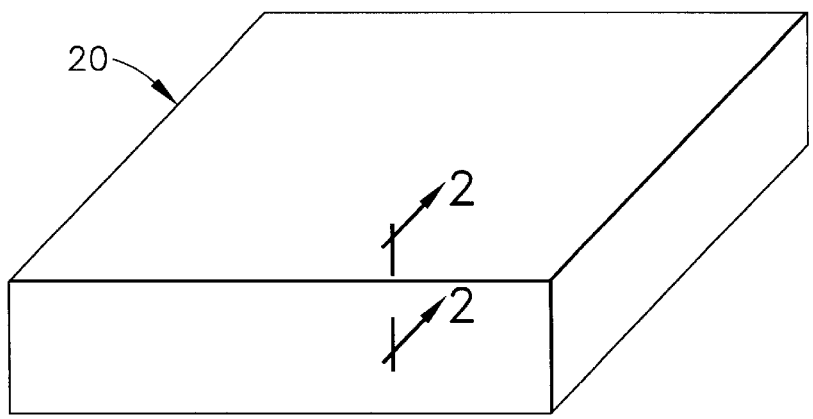
FIG. 1 is an article made of a cast nickel-base superalloy having a nil-ductility range.

FIG. 1 depicts an article 20 made of a cast nickel-base superalloy having a nil-ductility range from a solidus temperature of the superalloy to about 600° F. below the solidus temperature. The article 20 is typically a casting in the as-cast form, but the invention is not so limited and may be used on other type of articles. Examples of castings of interest used in aircraft gas turbine engines include fairings for the GE 414 engine.

Figure 2:
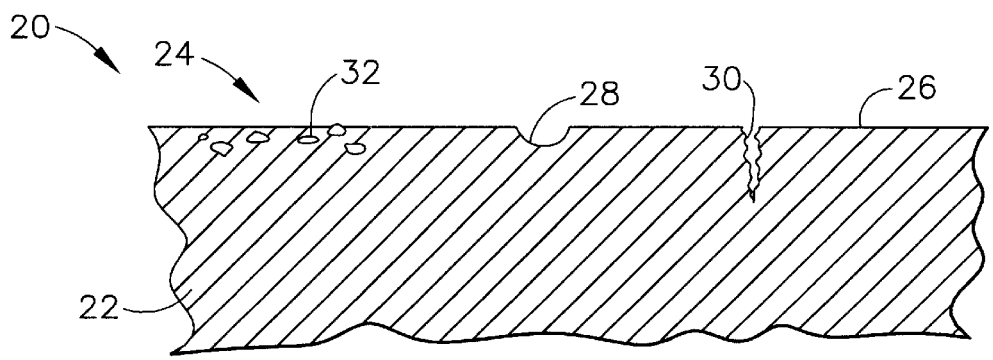
FIG. 2 is an enlarged sectional view through the casting of FIG. 1 prior to repair, taken on line 2—2.

As seen in FIG. 2, the article 20 has a body 22 with at least one near-surface defect 24 therein. The near-surface defect 24 is at or near a surface 26 of the body 22. Some exemplary near-surface defects 24 illustrated in FIG. 2 include a small pit 28, a small crack 30, and solid inclusions 32 of foreign matter such as small ceramic particles embedded into or slightly below the surface 26. These near-surface defects 24 result from the casting operation. Although care is taken during the casting operation to minimize the incidence of such near-surface defects, they cannot be completely avoided in any commercial-scale casting plant.

The near-surface defects 24, if located at critical areas of the article 20, may lead to the rejection of the article as unsuitable for its intended purpose. The present invention is concerned with removing the near-surface defects 24 without the necessity of heating the article 20 to high temperature as required by the approach of U.S. Pat. No. 5,897,801.

Figure 3:
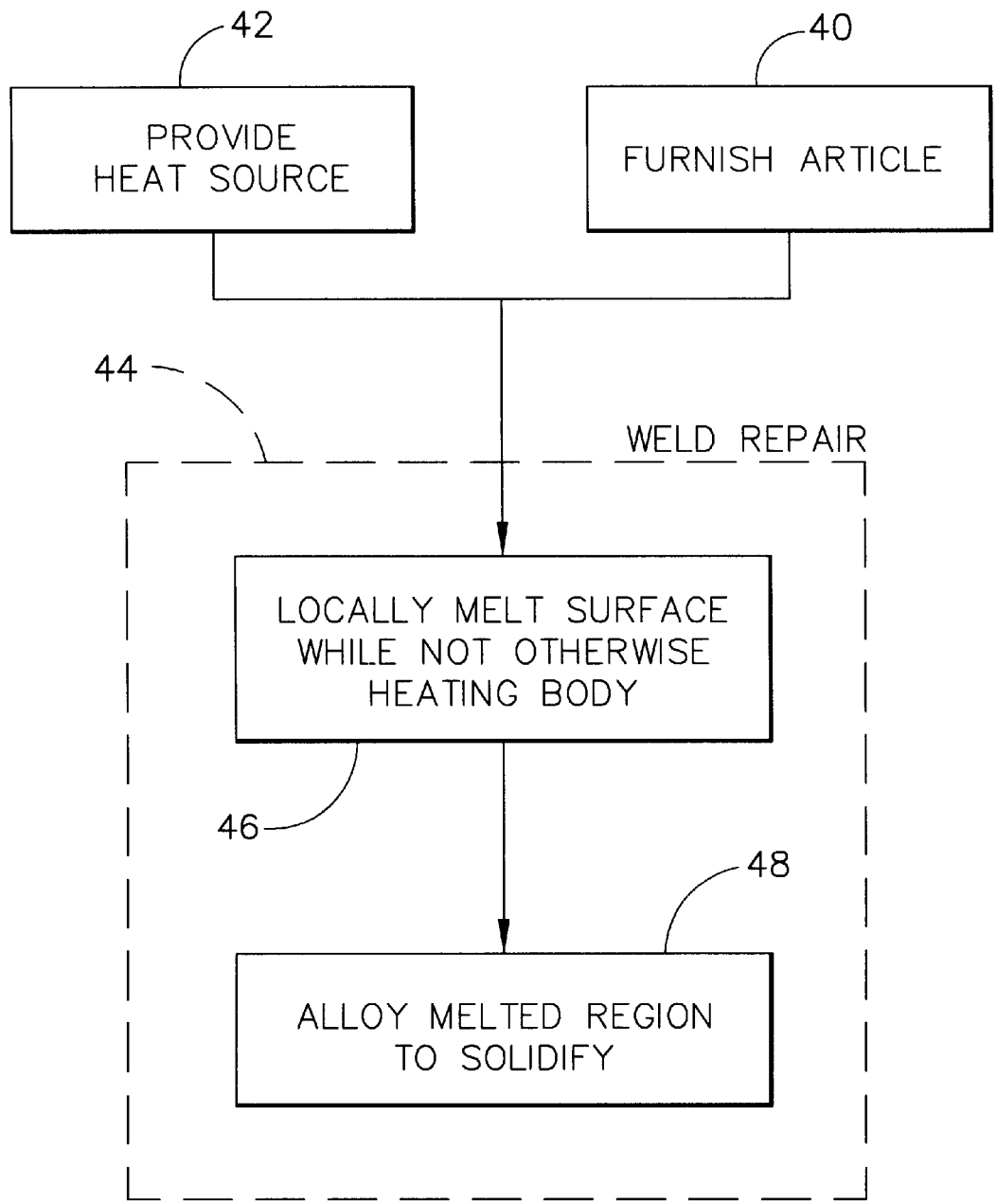
FIG. 3 is a block diagram of a process for repairing the article of FIG. 1.

FIG. 3 depicts a preferred approach for practicing the invention. The article 20 is furnished, numeral 40. The article is made of the nickel-base superalloy having a nil-ductility range from the solidus temperature of the superalloy to about 600° F. below the solidus temperature. Examples of such nickel-base superalloys include, but are not limited to, a composition in weight percent selected from the group consisting of R108, having a nominal composition of 0.07–0.10 percent carbon, 8.0–8.7 percent chromium, 9.0–10.0 percent cobalt, 0.4–0.6 percent molybdenum, 9.3–9.7 percent tungsten, 2.5–3.3 percent tantalum, 0.6–0.9 percent titanium, 5.25–5.75 percent aluminum, 0.01–0.02 percent boron, 1.3–1.7 percent hafnium, 0.1 percent maximum manganese, 0.06 percent maximum silicon, 0.01 percent maximum phosphorus, 0.004 percent maximum sulfur, 0.005–0.02 percent zirconium, 0.1 percent maximum niobium, 0.1 percent maximum vanadium, 0.1 percent maximum copper, 0.2 percent maximum iron, 0.003 percent maximum magnesium, 0.002 percent maximum oxygen, 0.002 percent maximum nitrogen, balance nickel and incidental impurities; Mar M-246, having a nominal composition of 9 percent chromium, 10.0 percent cobalt, 0.7 percent molybdenum, 10.0 percent tungsten, 1.0 percent titanium, 5.5 percent aluminum, 0.5 percent maximum iron, 0.15 percent carbon, 0.015 percent boron, 0.05 percent zirconium, 1.5 percent hafnium, 1.5 percent tantalum, balance nickel and incidental impurities; Mar M-200, having a nominal composition of 0.15 percent carbon, 9 percent chromium, 10 percent cobalt, 1 percent iron, 5 percent aluminum, 0.015 percent boron, 2 percent titanium, 12.5 percent tungsten, 0.05 percent zirconium, 1 percent niobium, balance nickel and incidental impurities; AF2-1DA, having a nominal composition of 0.35 percent carbon, 12 percent chromium, 10 percent cobalt, 3 percent molybdenum, 0.5 percent maximum iron, 4.6 percent aluminum, 0.015 percent boron, 3 percent titanium, 6 percent tungsten, 0.1 percent zirconium, 1.5 percent tantalum, balance nickel and incidental impurities; Udimet 500, having a nominal composition of 0.1 percent carbon, 18 percent chromium, 17 percent cobalt, 4 percent molybdenum, 2 percent iron, 3 percent aluminum, 3 percent titanium, balance nickel and incidental impurities; B1900, having a nominal composition of 0.1 percent carbon, 8 percent chromium, 10 percent cobalt, 6 percent molybdenum, 6 percent aluminum, 0.015 percent boron, 1 percent titanium, 0.1 percent zirconium, 4 percent tantalum, balance nickel and incidental impurities; Inconel 100, having a nominal composition of 0.18 percent carbon, 9.5 percent chromium, 15 percent cobalt, 3 percent molybdenum, 5.5 percent aluminum, 0.015 percent boron, 4.2 percent titanium, 0.06 percent zirconium, 1 percent vanadium, balance nickel and incidental impurities; Udimet 700, having a nominal composition of 0.1 percent carbon, 15 percent chromium, 18.5 percent cobalt, 5.25 percent molybdenum, 4.25 percent aluminum, 0.03 percent boron, 3.5 percent titanium, balance nickel and incidental impurities; and Rene 80, having a nominal composition of 0.17 percent carbon, 14 percent chromium, 9.5 percent cobalt, 4 percent molybdenum, 3 percent aluminum, 0.015 percent boron, 5 percent titanium, 4 percent tungsten, 0.03 percent zirconium, balance nickel and incidental impurities.

Figure 4:
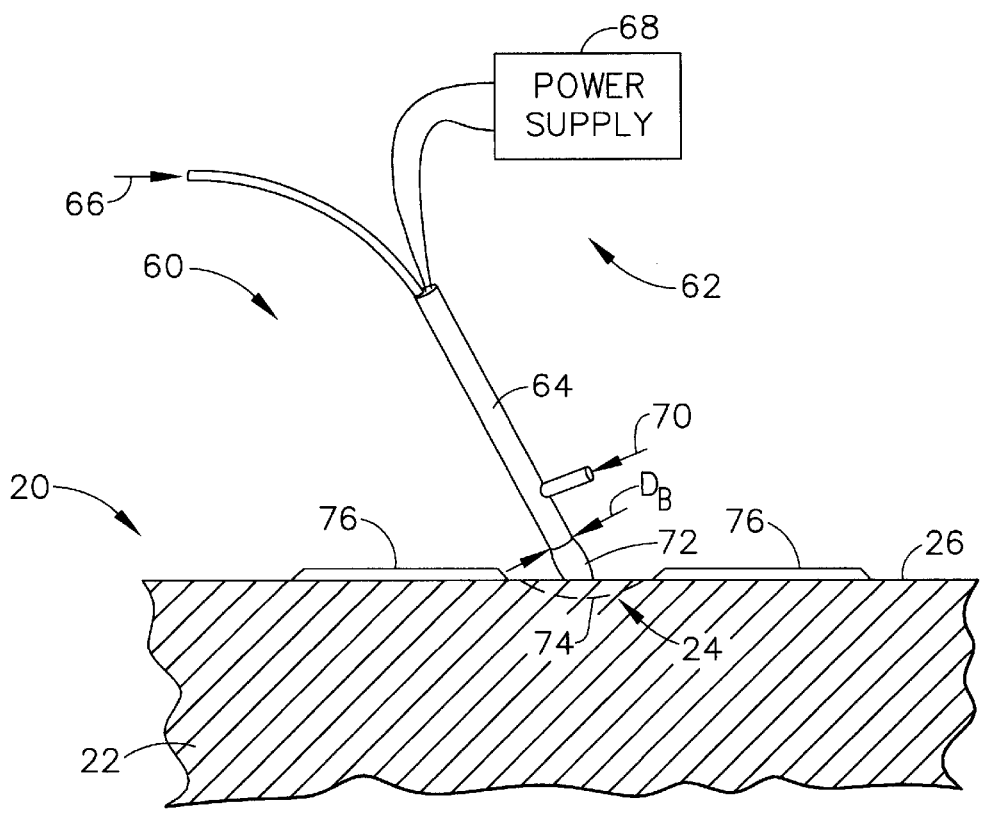
FIG. 4 is a schematic view of a weld repair apparatus having a heat source, in relation to the casting during the repair procedure.

A heat source 60 is provided to effect the weld repairs, numeral 42. The heat source 60 produces a highly directed, tightly confined, relatively low-power heating beam. A preferred heat source 60 is a plasma welder 62 as shown in FIG. 4. The plasma welder 62 includes a plasma welding torch 64 into which a plasma-gas flow 66 of a plasma gas such as argon is introduced. The power for the plasma welding torch is provided by a power supply 68. The heat source 60 may be of other operable types, such as a laser.

Figure 5:
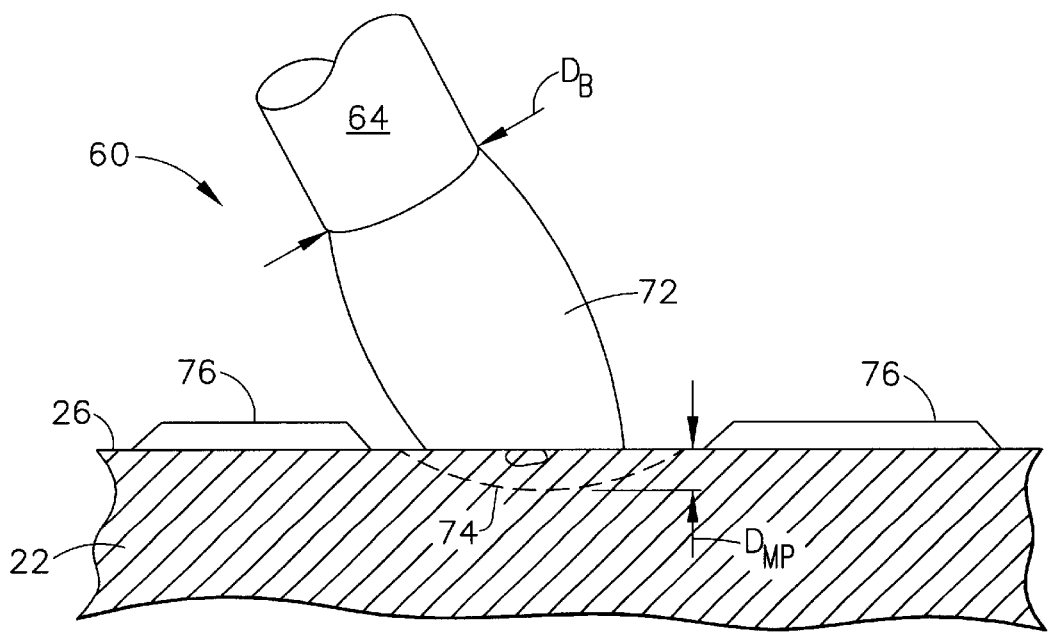
FIG. 5 is an enlarged detail of FIG. 4 during the repair procedure.

The heat source 60 is of a relatively low power. Preferably, the heat source 60 has a heat source beam 72 with a power level of no greater than about 5 amperes. The voltage is not critical, but typically is in the range of from about 15 to about 75 volts. Similarly, a diameter $D_B$ as it leaves the heat source 60 of the heat source beam 72 is no greater than about 0.025 inch, although the beam 72 may spread somewhat after it leaves the heat source 60. The result is that, as shown in FIG. 5, a molten pool depth $D_{MP}$ of a melted region 74 extending below the surface 26 of the article 20 is no greater than about 0.030 inch, more preferably no greater than about 0.020 inch, and most preferably no greater than about 0.010 inch. The molten pool depth $D_{MP}$ produced during welding may be readily determined after welding is complete by observing the microstructure of the final repaired article. The microstructure in the region that was melted as the melted region 74 during weld repair differs from that of the remainder of the article, generally by exhibiting a finer-scale structure resulting from the faster cooling at the end of the weld repair.

The low power level and small diameter of the heat source beam 72, and the small depth and lateral extent of the melted region 74 are important features of the invention. The nickel-base superalloys having a nil-ductility range are susceptible to cracking due to differential thermal strains produced between the surface regions and the deeper regions. They are additionally susceptible to liquation cracking and resulting hot tears at the grain boundaries, in the heat affected zone upon cooling after welding. Both of these damage mechanisms are dependent upon the depth of the melted region 74 and the consequent size of the heat affected zone. By restricting the power level and diameter of the heat source beam 72, the depth $D_{MP}$ of the melted region 74 is small. The volume change on solidification is typically about 3 percent. For a melted region having a scale of about 0.030 inch, the preferred maximum value of $D_{MP}$, the length change upon solidification is on the order of 0.0009 inch, which can be accommodated by the heat-affected zone without producing cracking or other defects. Significantly larger melted regions would produce larger length changes that could not be accommodated by the heat-affected zone. A maximum depth $D_{MP}$ of the melted region 74 of less than about 0.020 inch is even more preferred, and a maximum depth $D_{MP}$ of the melted region 74 of less than about 0.010 inch is most preferred. These smaller values of $D_{MP}$ result in even lower strains and stresses upon cooling, with less residual stress. However, the depth of the melted region 74 must be sufficiently great to remove the near-surface defect 24, up to the maximum permitted depth. Larger defects are not repairable by this approach.

The result is that the weld repair of relatively small near-surface defects is accomplished without heating the body 22 of the article 20, except as it may be heated incidentally from the heat source beam 72. Even that incidental heating is relatively small for a large-size article 20, because of the low power level of the heat source beam 72. Thus, if the power level, diameter, and/or depth of the melted region are too large, the present approach will not be operable.

The weld repair may be accomplished strictly by melting a region at the surface 26 of the article 20. The weld repair may optionally include a flow 70 of a filler metal which is introduced into the plasma welding torch 64, at least partially melted in the plasma, and thence fed into the melted region 74 that is melted by the plasma. The filler metal may be in powder or wire form, or other physically suitable form. The filler metal, when used, desirably has a filler metal composition that is substantially the same as that of the nickel-base superalloy of the article.

Returning to the discussion of FIG. 3, the near-surface defect 24 is weld repaired, numeral 44. The step of weld repairing 44 includes locally melting 46 the surface of the article 20 in a region of the near-surface defect 24 using the heat source 60 to form the melted region 74. The body 22 of the article 20 is not otherwise heated. The body 22 experiences some slight incidental heating due to the heat conducted from the melted region. To effect the local heating without adversely affecting neighboring regions and to prevent the melted region 74 from becoming too large, it may be desirable to provide run-out tabs 76 on the surface 26 at the sides of the intended melted region 74 of a material of higher melting point than the article 20. The run-out tabs 76 permit the heating by the heat source 60 to be initiated and terminated away from the melted region 74.

During the local melting step 46 as seen in FIG. 5, the melted region 74 extends downwardly from the surface 26 a depth of no more than $D_{mp}$. The depth $D_{MP}$ is greater than the size of the near-surface pits 28 and near-surface cracks 30. Upon melting, the near-surface pits 28 and near-surface cracks 30 are closed by the melted metal. The depth $D_{MP}$ is greater than the depth to which near-surface inclusions 32 extend, so that the inclusions 32 float upwardly through the melted metal to the surface. The effectiveness of the present approach is therefore limited to repairs of near-surface defects 24 that do not extend further into the article 20 than the depth $D_{MP}$. The present approach is therefore not intended to be of general applicability, unlike the approach of U.S. Pat. No. 5,897,801. For example, many blade tip repairs, leading-edge repairs, and trailing-edge repairs for damage to airfoils are not repairable by the present approach because the required melted depth is too large, and the present approach is not suitable for the joining of two separate articles by welding. On the other hand, the present approach is much faster and less expensive when used to repair the near-surface defects to which it is applicable, because the entire article need not be heated to elevated temperature and because it is not necessary to use a controlled-atmosphere chamber to protect the area being repaired.

After the local melting 46 that effects the weld repair, the melted region 74 is allowed to cool and solidify, numeral 48.

Figure 6:
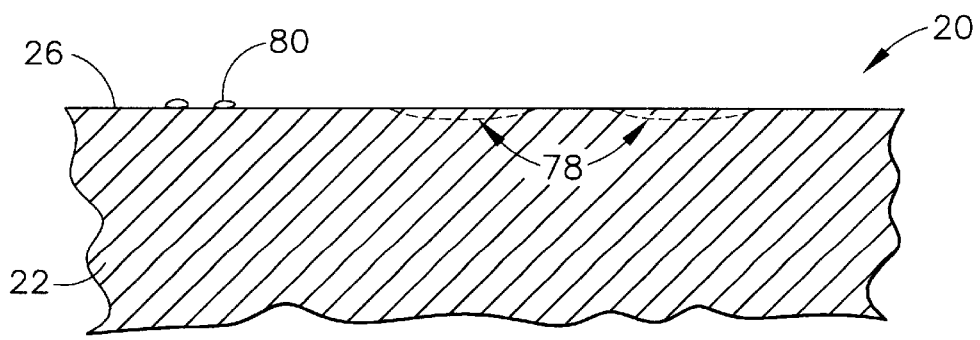
FIG. 6 is a view like that of FIG. 2, after weld repair is complete.

FIG. 6 depicts the article 20 at this point after completion of the weld repair. The near-surface pits 28 and near-surface cracks 30 have been removed from repaired regions 78 through the local melting process, and are now depicted by dashed lines to indicate their prior positions. Ceramic particles 80, which were previously the inclusions 32 below the surface 26 prior to repair (FIG. 2), have floated to the surface of the melted region and can be easily removed. As discussed earlier, it may be necessary to feed filler material into the molten region in each case during the weld repair, if removal of the near-surface defect 24 would result in too-large of a depression at the repaired surface of the article.

Although a particular embodiment of the invention has been described in detail for purposes of illustration, various modifications and enhancements may be made without departing from the spirit and scope of the invention.

Accordingly, the invention is not to be limited except as by the appended claims.

What is claimed is:

1. A method of weld repairing a nickel-base superalloy article having a nil-ductility range from a solidus temperature of the superalloy to about 600° F. below the solidus temperature, comprising the steps of furnishing the article made of the nickel-base superalloy having a nil-ductility range from the solidus temperature of the superalloy to about 600° F. below the solidus temperature, the article having a body with a near-surface defect near a surface thereof;

providing a heat source having a heat source beam with a power level of no greater than about 5 amperes;

weld repairing the near-surface defect, the step of weld repairing including the steps of locally melting the surface of the article in a region of the near-surface defect using the heat source to form a melted region, while not otherwise heating the body of the article, and thereafter allowing the melted region to solidify.

2. The method of claim 1, wherein th e step of finishing the article includes the step of providing the article in an as-cast state.

3. The method of claim 1, wherein the step of furnishing the article includes the step of furnishing a nickel base superalloy having a composition, in weight percent, selected from the group consisting of R108, having a nominal composition of 0.07–0.10 percent carbon, 8.0–8.7 percent chromium, 9.0–10.0 percent cobalt, 0.4–0.6 percent molybdenum, 9.3–9.7 percent tungsten, 2.5–3.3 percent tantalum, 0.6–0.9 percent titanium, 5.25–5.75 percent aluminum, 0.01–0.02 percent boron, 1.3–1.7 percent hafnium, 0.1 percent maximum manganese, 0.06 percent maximum silicon, 0.01 percent maximum phosphorus, 0.004 percent maximum sulfur, 0.005–0.02 percent zirconium, 0.1 percent maximum niobium, 0.1 percent maximum vanadium, 0.1 percent maximum copper, 0.2 percent maximum iron, 0.003 percent maximum magnesium, 0.002 percent maximum oxygen, 0.002 percent maximum nitrogen, balance nickel and incidental impurities; Mar M-246, having a nominal composition of 9 percent chromium, 10.0 percent cobalt, 0.7 percent molybdenum, 10.0 percent tungsten, 1.0 percent titanium, 5.5 percent aluminum, 0.5 percent maximum iron, 0.15 percent carbon, 0.015 percent boron, 0.05 percent zirconium, 1.5 percent hafnium, 1.5 percent tantalum, balance nickel and incidental impurities; Mar M-200, having a nominal composition of 0.15 percent carbon, 9 percent chromium, 10 percent cobalt, 1 percent iron, 5 percent aluminum, 0.015 percent boron, 2 percent titanium, 12.5 percent tungsten, 0.05 percent zirconium, 1 percent niobium, balance nickel and incidental impurities; AF2-1DA, having a nominal composition of 0.35 percent carbon, 12 percent chromium, 10 percent cobalt, 3 percent molybdenum, 0.5 percent maximum iron, 4.6 percent aluminum, 0.015 percent boron, 3 percent titanium, 6 percent tungsten, 0.1 percent zirconium, 1.5 percent tantalum, balance nickel and incidental impurities; Udimet 500, having a nominal composition of 0.1 percent carbon, 18 percent chromium, 17 percent cobalt, 4 percent molybdenum, 2 percent iron, 3 percent aluminum, 3 percent titanium, balance nickel and incidental impurities; B1900, having a nominal composition of 0.1 percent carbon, 8 percent chromium, 10 percent cobalt, 6 percent molybdenum, 6 percent aluminum, 0.015 percent boron, 1 percent titanium, 0.1 percent zirconium, 4 percent tantalum, balance nickel and incidental impurities; Inconel 100, having a nominal composition of 0.18 percent carbon, 9.5 percent chromium, 15 percent cobalt, 3 percent molybdenum, 5.5 percent aluminum, 0.015 percent boron, 4.2 percent titanium, 0.06 percent zirconium, 1 percent vanadium, balance nickel and incidental impurities; Udimet 700, having a nominal composition of 0.1 percent carbon, 15 percent chromium, 18.5 percent cobalt, 5.25 percent molybdenum, 4.25 percent aluminum, 0.03 percent boron, 3.5 percent titanium, balance nickel and incidental impurities; and Rene 80, having a nominal composition of 0.17 percent carbon, 14 percent chromium, 9.5 percent cobalt, 4 percent molybdenum, 3 percent aluminum, 0.015 percent boron, 5 percent titanium, 4 percent tungsten, 0.03 percent zirconium, balance nickel and incidental impurities.

4. The method of claim 1, wherein the step of providing a heat source includes the step of providing a plasma welding torch.

5. The method of claim 1, wherein the melted region has a molten pool depth of no greater than about 0.030 inch.

6. The method of claim 1, wherein a diameter of the heat source beam is no greater than about 0.025 inch.

7. The method of claim 1, wherein the near-surface defect is a solid inclusion.

8. The method of claim 1, wherein the near-surface defect is selected from the group consisting of a pit and a crack.

9. The method of claim 1, wherein the step of weld repairing includes the steps of providing a filler metal having a filler metal composition that is substantially the same as that of the nickel-base superalloy of the article, and feeding the filler metal into the melted region.

10. The method of claim 1, wherein the step of weld repairing includes the step of welding repairing the article without placing the article into a special atmosphere.

11. A method of weld repairing a cast nickel-base superalloy article having a nil-ductility range from a solidus temperature of the superalloy to about 600° F. below the solidus temperature, comprising the steps of furnishing the article made of the cast nickel-base superalloy having a nil-ductility range from the solidus temperature of the superalloy to about 600° F. below the solidus temperature, the article having a body with a near-surface defect near a surface thereof;

providing a heat source;

weld repairing the near-surface defect, the step of weld repairing including the steps of locally melting the surface of the article in a region of the near-surface defect using the heat source to form a melted region having a molten pool depth of no greater than about 0.030 inch, while not otherwise heating the body of the article, and thereafter allowing the melted region to solidify.

12. The method of claim 11, wherein the step of furnishing the article includes the step of providing the article in an as-cast state.

13. The method of claim 11, wherein the step of furnishing an article includes the step of furnishing a nickel base superalloy having a composition, in weight percent, selected from the group consisting of R108, having a nominal composition of 0.07–0.10 percent carbon, 8.0–8.7 percent chromium, 9.0–10.0 percent cobalt, 0.4–0.6 percent molybdenum, 9.3–9.7 percent tungsten, 2.5–3.3 percent tantalum, 0.6–0.9 percent titanium, 5.25–5.75 percent aluminum, 0.01–0.02 percent boron, 1.3–1.7 percent hafnium, 0.1 percent maximum manganese, 0.06 percent maximum silicon, 0.01 percent maximum phosphorus, 0.004 percent maximum sulfur, 0.005–0.02 percent zirconium, 0.1 percent maximum niobium, 0.1 percent maximum vanadium, 0.1 percent maximum copper, 0.2 percent maximum iron, 0.003 percent maximum magnesium, 0.002 percent maximum oxygen, 0.002 percent maximum nitrogen, balance nickel and incidental impurities; Mar M-246, having a nominal composition of 9 percent chromium, 10.0 percent cobalt, 0.7 percent molybdenum, 10.0 percent tungsten, 1.0 percent titanium, 5.5 percent aluminum, 0.5 percent maximum iron, 0.15 percent carbon, 0.015 percent boron, 0.05 percent zirconium, 1.5 percent hafnium, 1.5 percent tantalum, balance nickel and incidental impurities; Mar M-200, having a nominal composition of 0.15 percent carbon, 9 percent chromium, 10 percent cobalt, 1 percent iron, 5 percent aluminum, 0.015 percent boron, 2 percent titanium, 12.5 percent tungsten, 0.05 percent zirconium, 1 percent niobium, balance nickel and incidental impurities; AF2-1DA, having a nominal composition of 0.35 percent carbon, 12 percent chromium, 10 percent cobalt, 3 percent molybdenum, 0.5 percent maximum iron, 4.6 percent aluminum, 0.015 percent boron, 3 percent titanium, 6 percent tungsten, 0.1 percent zirconium, 1.5 percent tantalum, balance nickel and incidental impurities; Udimet 500, having a nominal composition of 0.1 percent carbon, 18 percent chromium, 17 percent cobalt, 4 percent molybdenum, 2 percent iron, 3 percent aluminum, 3 percent titanium, balance nickel and incidental impurities; B1900, having a nominal composition of 0.1 percent carbon, 8 percent chromium, 10 percent cobalt, 6 percent molybdenum, 6 percent aluminum, 0.015 percent boron, 1 percent titanium, 0.1 percent zirconium, 4 percent tantalum, balance nickel and incidental impurities; Inconel 100, having a nominal composition of 0.18 percent carbon, 9.5 percent chromium, 15 percent cobalt, 3 percent molybdenum, 5.5 percent aluminum, 0.015 percent boron, 4.2 percent titanium, 0.06 percent zirconium, 1 percent vanadium, balance nickel and incidental impurities; Udimet 700, having a nominal composition of 0.1 percent carbon, 15 percent chromium, 18.5 percent cobalt, 5.25 percent molybdenum, 4.25 percent aluminum, 0.03 percent boron, 3.5 percent titanium, balance nickel and incidental impurities; and Rene 80, having a nominal composition of 0.17 percent carbon, 14 percent chromium, 9.5 percent cobalt, 4 percent molybdenum, 3 percent aluminum, 0.015 percent boron, 5 percent titanium, 4 percent tungsten, 0.03 percent zirconium, balance nickel and incidental impurities.

14. The method of claim 11, wherein the step of providing a heat source includes the step of providing a plasma welding torch.

15. The method of claim 11, wherein a diameter of the heat source beam is no greater than about 0.025 inch.

16. The method of claim 11, wherein the near-surface defect is a solid inclusion.

17. The method of claim 11, wherein the near-surface defect is selected from the group consisting of a pit and a crack.

18. The method of claim 11, wherein the step of weld repairing includes the steps of providing a filler metal having a filler metal composition that is substantially the same as that of the nickel-base superalloy of the article, and feeding the filler metal into the melted region.

19. The method of claim 11, wherein the step of furnishing the article includes the step of providing the article having grain boundaries therein.

20. The method of claim 11, wherein the step of weld repairing includes the step of welding repairing the article without placing the article into a special atmosphere.

* * * * *